United States Patent Office 3,707,356
Patented Dec. 26, 1972

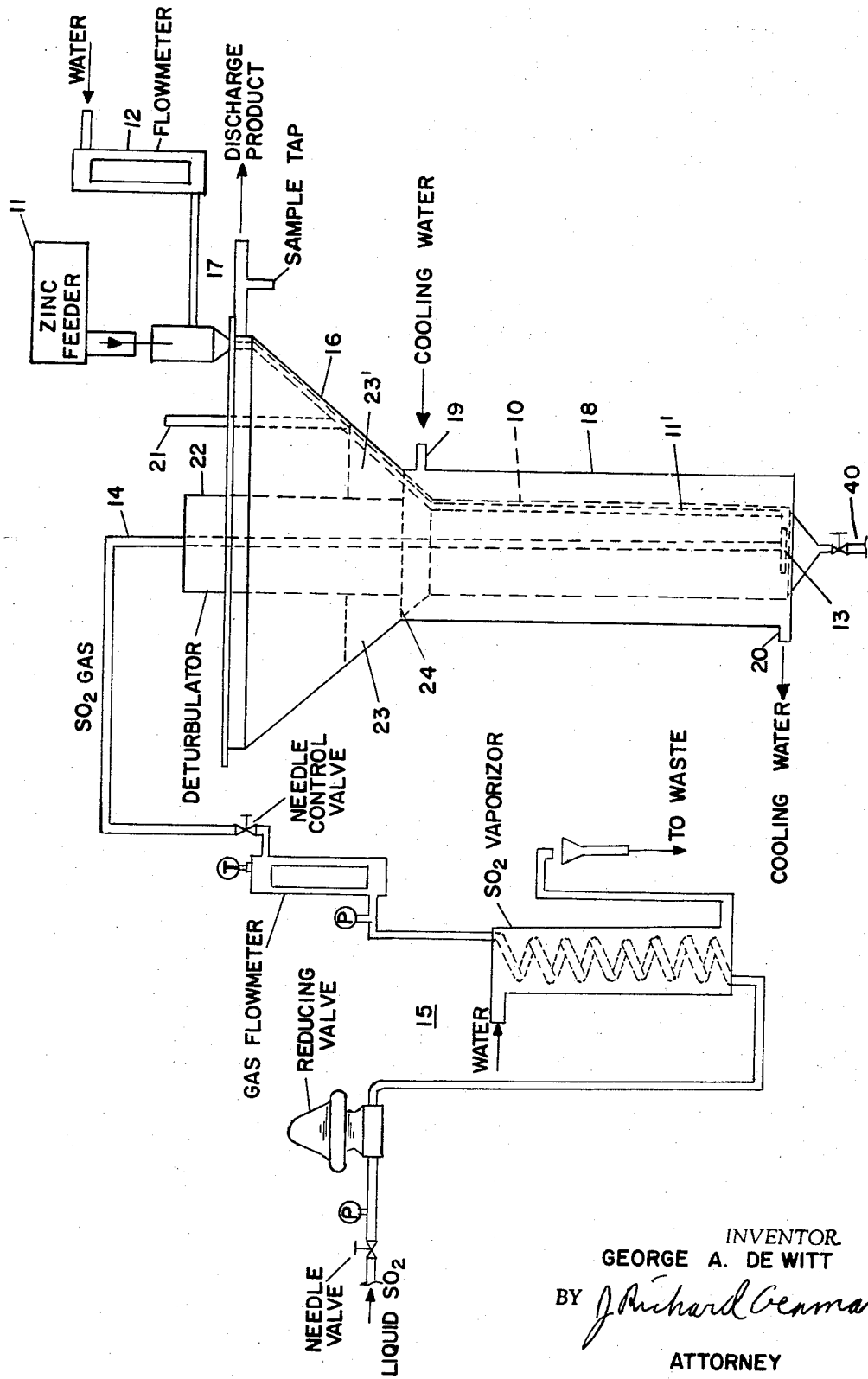

3,707,356
APPARATUS FOR DETURBULATING
TURBULENT SOLUTIONS
George A. De Witt, Ducktown, Tenn., assignor to Cities
Service Company, New York, N.Y.
Filed Dec. 16, 1970, Ser. No. 98,515
Int. Cl. B01j 1/00; C01b 17/98
U.S. Cl. 23—285    4 Claims

ABSTRACT OF THE DISCLOSURE

An apparatus for deturbulating turbulent solutions is provided comprising reactor, deturbulator and clarifier sections. The apparatus is useful in making zinc hydrosulfite solutions having a concentration greater than about 100 grams per liter of zinc hydrosulfite.

BACKGROUND IN THE INVENTION

In many chemical reactions the product is a turbulent solution containing particulate matter and it is often necessary to allow the product to reach a quiescent state before removing these particulates. For example, the preparation of zinc hydrosulfite solutions by reacting zinc and sulfur dioxide gas in water to yield a solution of zinc hydrosulfite is well known. When solutions having a concentration of less than about 100 grams per liter of zinc hydrosulfite are prepared, the manufacture is a rather simple operation. Thus, the zinc, sulfur dioxide and water are combined at the appropriate concentrations and the reaction takes place rather quietly. Very frequently, a clarifier section can be fitted to the top of the reactor, the hydrosulfite solution having the desired concentration being drawn off from the top of the clarifier section as an overflow substantially free of solids. Unfortunately, however, when zinc hydrosulfite solutions having a concentration in excess of about 100 grams per liter, for example from about 100 to about 600 grams per liter, are prepared, the reaction is accompanied by great turbulence and the use of a clarifier in direct conjunction with the reactor is made impossible. The turbulence of the reaction causes the zinc particles to be carried throughout the clarifier, resulting in an overflow product containing unreacted zinc. Thus, in order to prepare zinc hydrosulfite solutions containing in excess of about 100 grams per liter of zinc hydrosulfite and containing substantially no unreacted zinc, it has previously been necessary to prepare the desired solution in a reactor, allow the reaction to achieve a quiescent state, filter the solution to remove zinc and return these particulate zinc solids to the reactor for use in another batch of zinc hydrosulfite. It would be highly desirable to be able to react the zinc in a reactor, deturbulate the solution, and clarify the solution of particulate zinc material and be able to continuously withdraw a zinc hydrosulfite product having a concentration greater than about 100 grams per liter of zinc hydrosulfite and being substantially free of solids. It would additionally be highly desirable to have an apparatus capable of conducting a chemical reaction and deturbulating and clarifying the product.

SUMMARY OF THE INVENTION

This invention relates to an apparatus capable of continuously deturbulating and clarifying a turbulent solution which comprises, in combination, a reaction zone means for discharging reactants into said reaction zone, deturbulator means in communication with the reaction zone for reducing the turbulence of the turbulent solution, clarifier means, communicating with both the reaction zone and the deturbulator means, for obtaining a quiescent product solution from said clarifier means substantially free of particulate matter, and product removal means for continuously withdrawing a quiescent production solution. In another aspect, zinc hydrosulfite having a concentration greater than about 100 grams per liter of zinc hydrosulfite can be continuously prepared by feeding sulfur dioxide, zinc and water into a reactor containing excess zinc, the reaction between the sulfur dioxide and zinc being exothermic and causing turbulence, deturbulating the zinc hydrosulfite, clarifying the zinc hydrosulfite to obtain a quiescent solution substantially free of zinc and recovering the clear hydrosulfite solution which is characterized by a solids content less than about 0.5 gram per liter.

Broadly, the reactor apparatus described herein can be used for carrying out any reaction involving solids in suspension in a liquid where the reaction mixture is turbulent and a clarified product solution is desired.

BRIEF DESCRIPTION OF THE DRAWING

The subject apparatus together with one mode of using it in an overall process for the manufacture of high-strength zinc hydrosulfite are illustrated in the drawing.

DESCRIPTION OF THE INVENTION

As indicated, this invention relates to an apparatus capable of continuously deturbulating and clarifying a turbulent solution. In one embodiment this invention relates to the preparation of zinc hydrosulfite solutions containing more than about 100 grams per liter of zinc hydrosulfite. The apparatus of this invention and its use will be described in greater detail in connection with a process for the preparation of high-strength zinc hydrosulfite.

In the preparation of high-strength zinc hydrosulfite, metallic finely divided zinc, which can be in the form of a powder or other fine particulate form, with water and with sulfur dioxide gas are fed into reactor 10 at appropriate rates, controlled or measured by well-known means. Such means are shown in the drawing as zinc feeder 11 and water flow meter 12. Zinc feeder 11 feeds zinc dust through pipe 11' to the bottom of reactor 10. The sulfur dioxide gas is dispersed into the water and zinc dust in recator 10 by a sparger or nozzle 13 at the bottom of reactor 10. Sparger 13 is supplied with sulfur dioxide gas by pipe 14. The sulfur dioxide gas can be supplied to pipe 14 from any suitable source. In the embodiment represented in the drawing, the apparatus illustrated is known apparatus for converting liquid sulfur dioxide to gaseous sulfur dioxide. This apparatus is generally indicated at 15.

Initially, there is present in reactor 10 a supply of particulate metallic zinc in suspension in water. Thereafter the zinc dust is fed into reactor 10 at a rate sufficient to react stoichiometrically with the sulfur dioxide gas and additionally sufficient to maintain at all times an excess of unreacted metallic zinc dust in the reactor. The sulfur dioxide reacts with the particulate metallic zinc forming zinc hydrosulfite and the unreacted particulate zinc is maintained in suspension in reactor 10 by the turbulence caused therein by the reaction of the materials as well as the flow of feed materials. The reaction of the zinc with sulfur dioxide is rapid because more than stoichiometric amounts of zinc are provided in reactor 10. The presence of this unreacted excess zinc in suspension in the solution prevents the decomposition of the zinc hydrosulfite solution that has been formed. The reason for this is that the solution of zinc hydrosulfite is readily decomposed by acid but decomposition by acid in the system is effectively prevented by the excess of metallic zinc which reacts with sulfurous acid as it forms.

Sulfur dioxide can be introduced into reactor 10 through sparger 13 in the form of liquid $SO_2$. Sulfur dioxide can also be introduced into reactor 10 as a solution of $SO_2$ in water produced externally of reactor 10 and supplied thereto by pipe 14 and sparger 13.

As indicated, the reaction between the zinc dust and sulfur dioxide and water, when present in a concentration high enough to produce a zinc hydrosulfite solution having a concentration greater than about 100 grams per liter of zinc hydrosulfite, is quite turbulent and this turbulence is carried up into deturbulator 22 from the reactor 10. There is apparently a phenomenon which may be considered a "jet effect" whereby the turbulence is contained within the confines of the deturbulator and does not extend into the surrounding clarifier section 16. Thus, in the deturbulator is carried a portion of the finer particles of the metallic zinc along with the zinc hydrosulfite solution. Deturbulated fluid exits the deturbulator in its lower opening and enters the clarifier 16 through annular opening 24. Surrounding the deturbulator is the settling and clarifying section 16. This section surrounds deturbulator 22 and is above and in communication with a reactor 10 via annular opening 24. A portion of the finer particles of the metallic zinc is carried along with zinc hydrosulfite solution into settling and clarifying section 16. In clarifying section 16 the unreacted zinc particles settle out of the solution and return by gravity to reactor 10. The size of reactor 10 and of clarifier 16 determine the retention times required for complete reaction and clarification of the zinc hydrosulfite. The product, zinc hydrosulfite solution, substantially free of unreacted metallic zinc overflows clarifier 16 through pipe 17 where it is withdrawn for utilization for any desired purpose such as in bleaching clay, wood pulp, and the like.

Reactor 10 is provided vertical walls in order to provide and maintain the "jet effect" which enables essentially all of the turbulence of the reaction to be dissipated in one confined location. The temperature in reactor 10 is controlled and regulated by means of cooling water supplied to an appropriate cooling jacket 18 by inlet pipe 19 and exhaust pipe 20 as shown, or by cooling pipes within reactor 10. A sludge drawoff is located at 40. The height and diameter of the reactor are important parameters in the successful functioning of this apparatus. The walls of the reactor are preferably vertical to create a jet leaving the throat of the reactor and entering the deturbulator. The reactor height and diameter, and particularly the height to diameter ratio of the reactor is very important. If the reactor is too short, it will be inefficient due to short period of contact between the sulfur dioxide and the zinc. On the other hand, if the reactor is too high, it becomes inefficient in that there is no benefit derived and larger amounts of materials must be consumed. The reactor diameter similarly is an important parameter insofar as it is essential that the zinc be kept in suspension in the reactor. It will be appreciated that the problem is one of balancing the factors so that the zinc is kept in suspension in the reactor, and settles out in the clarifier part of the apparatus. It has been found that a reactor height to diameter ratio of from about 3 to about 5 to 1 results in a reactor having useful dimensions, with particularly preferred results being obtained when the reactor height to dimeter ratio is from 3 to 1 to about 4 to 1.

Above the reactor section and adapted to capture and contain the jet of turbulence exiting the reactor section is the deturbulator 22 which is opened on both ends. The diameter of the deturbulator is the same as that of the reactor while the height of the deturbulator will be at least the height of the clarifier section. The deturbulator can be of any convenient height adapted to achieve the desired result. The function of the deturbulator is to contain the turbulent jet exiting from the reactor section and to permit this turbulent fluid to oscillate in a confined location whereby undue turbulence in the clarifier section is avoided. Although there is communication between the reactor and the clarifier via annular opening 24, there is, surprisingly, very little disturbance in the clarifier section. Deturbulator 22 is held in place in clarifier 16 by vanes 23 and 23'. There are perhaps three to four of these vanes distributed evenly which hold the deturbulator section in its fixed location above the reactor section.

The clarifier 16 is an inverted truncated cone which surrounds the deturbulator and communicates with the reactor. Fluid rises in the clarifier while zinc particles settle out and fall back through annular opening 24 into the reactor. The height and diameter of the clarifier will be governed by the slope angle and velocity of the overflow. Depending on the conditions, an excessively high rate of overflow is inconsistent with good clarification. Desirably, the slope angle of the clarifier walls should be in the range from about 50° to about 65° from the horizontal. If the slope angle of the clarifier walls is too shallow, the zinc particles which settle out of the solution during clarification do not slide back down into the reactor and zinc tends to build up on the clarifier walls. On the other hand, if the slope angle of the clarifier walls is too steep, the clarifier must be too large to do its intended job efficiently.

As indicated above, the deturbulator is placed at a height above the reactor sufficient to capture the turbulent jet emanating from the reactor and yet which is far enough away to leave a suitable annular opening between the deturbulator and the sloping clarifier walls to allow fluid to rise around the deturbulator and to allow zinc particles to slide back down into the reactor section. Optimum location of the deturbulator can readily be determined depending on the particular dimensions of this system.

It is desired that the product exiting the clarifier section have a low solids content. It is desirable that the solids content be below about 5 grams per liter and preferably less than one gram per liter. Quite obviously a high solids content in the product overflow would necessitate the type of filtering and additional handling that are obviated by this invention. For some purposes however, even the low solids content provided by this apparatus is objectionable and in such case the solution can be filtered prior to use.

A pH electrode 21 can be immersed in the reaction solution adjacent deturbulator 22 and connected to an appropriate indicating meter (not shown) to provide an indication of the required concentration of excess zinc metal. The product withdrawn should have a pH range of about 4.0 to about 5.0.

In operation the following procedure can be used, beginning with an empty reactor. Water can be fed into the reactor at the desired feed rate. When the reactor is half filled sufficient excess zinc to react under the contemplated conditions of $SO_2$ addition is added. At the same time $SO_2$ addition is begun at twice the anticipated rate and zinc powder is fed in, also at twice the normal rate. When the reactor has filled the zinc and $SO_2$ feed rates are reduced to the calculated level. The product is removed as it overflows the clarifier.

In another embodiment, this invention can be used in the manufacture of copper sulfate solutions. Copper snlfate is typically made by reacting copper, usually in form of shot copper, with a solution of copper sulfate and sulfuric acid in the presence of air or oxygen. Typically, the air and liquid are flowed concurrently upward through the bed of shot copper, as described and claimed in U.S. Pat. No. 2,533,245 of George E. Harike. One of the problems encountered when flowing the solution of sulfuric acid and copper sulfate in conjunction with air upward through the bed of shot copper, particularly when a circulating system is used, is that the copper, as the reaction proceeds, is gradually eroded. Eventually, the solution of copper sulfate and sulfuric acid also contains substantial amounts of particulate copper. The solution, insofar as it is proceeding concurrently upward through the bed of shot copper in conjunction with air is quite turbulent and the same difficulties are encountered in attempting to obtain a clarified copper sulfate solution as is encountered when trying to obtain a clarified zinc hydrosulfite solution. The apparatus described herein, that is, the reactor, deturbulator and clarifier can be successfully employed in the reaction of copper with the solution of copper sulfate and sulfuric acid in the presence of air to obtain a clarified solution. Thus, the reactor section can be fitted to provide a concurrent upward flow of solution and air through a bed of shot copper, with a deturbulator being positioned above the reactor and a cone clarifier being positioned about the deturbulator in the manner shown and described for zinc hydrosulfite solutions. Thus, turbulent copper sulfate containing particulate copper emanating from a reactor zone can be deturbulated and clarified as shown in the case of zinc hydrosulfite to yield copper sulfate solutions substantially free of particulate copper.

From the above it will be clear that the combination of a deturbulator and a clarifier can be successfully employed with a reactor containing a variety of reactants and products. It is also apparent that in place of the reactor one could substitute any convenient or desired source of turbulent fluid containing particulate matter. In such case the deturbulator dimensions can be varied as necessary to achieve the desired result.

EXAMPLE

Into a reactor as illustrated by the drawing were fed water at a rate of .158 g.p.m. at 76° F., 2.19 s.c.f.m. of $SO_2$ at 106° F., and zinc at a rate 87.5 grams per minute. The reactor temperature was 120° F. and the reactor velocity was 1.82 g.p.m. per square foot. The start-up time to reach equilibrium took approximately 2 hours. The product which overflowed was characterized by a pH of 3.8, a temperature of 119° F., specific gravity of 1.312, a zinc hydrosulfite content of 382 grams per liter and a solids content of 0.48 gram per liter.

I claim:
1. Deturbulating and clarifying apparatus comprising:
   (a) a generally vertical cylindrical reactor;
   (b) a generally conical clarifier positioned above and in fluid communication with said reactor;
   (c) a generally vertical cylindrical deturbulator positioned above said reactor in axial alignment therewith and spaced vertically therefrom, said deturbulator being of substantially the same diameter as the reactor;
   (d) means for introducing fluid and solid reactants into said reactor;
   (e) means for removing liquid product from said clarifier.

2. Apparatus of claim 1 in which the deturbulator is positioned as to form an unobstructed aperture between said reactor and deturbulator.

3. Apparatus according to claim 2 in which the clarifier is an inverted truncated cone having walls with a slope angle of from about 50° to about 65° from the horizontal and wherein the lower portion of the clarifier cooperates with the deturbulator and upper portion of the reactor to form a generally annular opening surrounding the lower portion of the deturbulator and in fluid communication with the upper portion of the reactor.

4. Apparatus according to claim 3 in which means is provided for introducing gaseous reactant to the lower portion of the reactor and for withdrawing liquid product from an upper portion of the clarifier.

References Cited
UNITED STATES PATENTS

| | | | |
|---|---|---|---|
| 2,767,847 | 10/1956 | Russell et al. | 210—208 X |
| 3,129,066 | 4/1964 | Ambrogi et al. | 23—285 X |

JAMES H. TAYMAN, Jr., Primary Examiner

U.S. Cl. X.R.

23—283, 116, 125, 288 E; 210—208